UNITED STATES PATENT OFFICE.

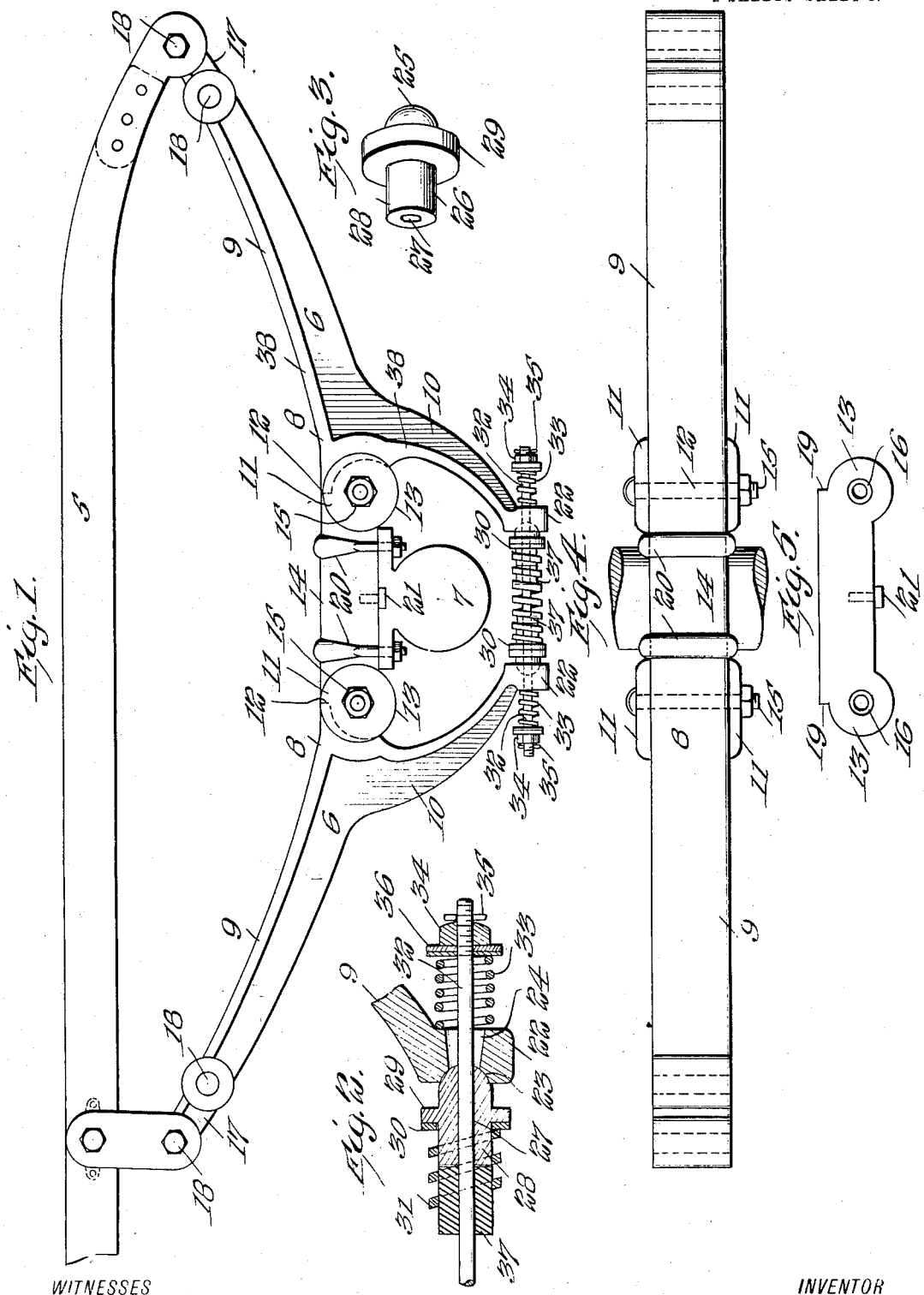

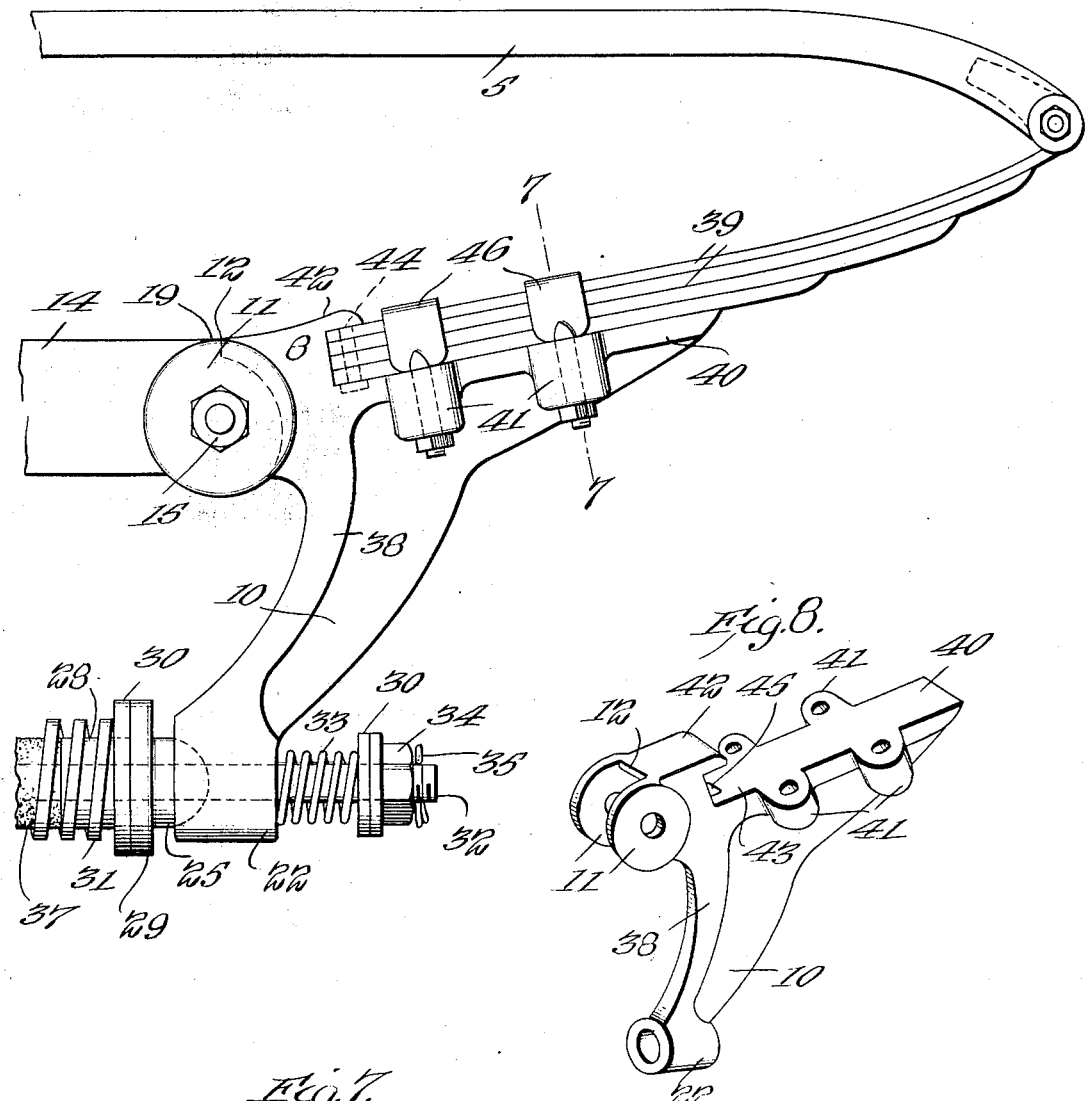

ARTHUR COLLETTE, OF BROCKTON, MASSACHUSETTS.

VEHICLE-SPRING.

1,026,496.  Specification of Letters Patent.  Patented May 14, 1912.

Application filed December 18, 1911. Serial No. 666,401.

*To all whom it may concern:*

Be it known that I, ARTHUR COLLETTE, a citizen of the United States, residing at Brockton, in the county of Plymouth and State of Massachusetts, have invented certain new and useful Improvements in Vehicle-Springs, of which the following is a specification.

This invention relates to shock absorbers for motor and other vehicles, and also to means for readily modifying the resistance or degree of resiliency of the spring organization relatively to the weight or load imposed on the running gear.

The primary object of the invention is to provide novel resilient shock absorbing means between the vehicle body and running gear having a fulcrumed application and permitting the body, when depressed by increase in weight for instance, to shift toward the fulcrum points of the shock absorbing means, or serving to yieldingly resist both the downward movement and rebound of vehicle bodies in order that the degrees of shock to vehicle bodies may be minimized and wear on the running gear and absorber organization materially reduced, and whereby also irregular shifting movement, or lateral strain on the vehicle body and running gear is prevented.

A further object of the invention is to provide a shock absorber and regulator for vehicles of a comparatively simple structure and capable of being readily applied and adequately resilient to perform the functions desired.

With these and other objects and advantages in view, the invention consists in the construction and arrangement of the several parts which will be more fully hereinafter described and claimed.

In the drawings:—Figure 1 is a side elevation of a part of the body structure or frame and running gear showing the improved shock absorber applied thereto. Fig. 2 is a detail longitudinal section, on an enlarged scale, of a portion of the absorber. Fig. 3 is a detail perspective view of one of the pressure caps. Fig. 4 is a top plan view of the bearers or levers and a part of the axle showing the connecting means therefor. Fig. 5 is a detail elevation of the connecting saddle and clip support for the bearers or levers and axle. Fig. 6 is a side elevation of a part of the body structure embodying a leaf spring organization, and showing the features of the invention applied thereto and including means for permitting ready replacement of the spring leaves and providing for positive retention thereof when applied. Fig. 7 is a cross section on the line 7—7 of Fig. 6. Fig. 8 is a detail perspective view of a bearer or support for the lower extremities of the spring leaves.

The numeral 5 designates a part of the vehicle frame to which the improved shock absorber is connected. It will be understood, however, that the absorber may be directly attached to a vehicle body or applied in any manner desired between the running gear and vehicle body. The shock absorber organization comprises levers 6 arranged in pairs on opposite sides of the vehicle or in connection with opposite portions of the axle 7 and each lever is essentially in the form of an angle lever, or each is a lever having an elbow 8, a long arm 9 and depending arm 10. The elbow 8 of each bearer or lever has opposite fulcrum flanges 11 of disk-like form and an abutting shoulder 12. The elbows are movably connected to the opposite disk-like ends 13 of a connecting saddle or clip support 14 by means of bolts 15, the openings for the bolts in the ends 13 having steel bushings 16 to withstand wear and adapted to be replaced in the event of wear without requiring the levers to be renewed. The couplings 17 between the ends of the long arms 9 and the frame or body 5 are of a pivotal character and are likewise provided with steel bushings for the pivot bolts 18. The saddle 14 also has shoulders 19 at the upper portions of the ends 13 against which the shoulders 12 of the lever elbows 8 abut to provide for maintaining the axle 7 in regular position or preventing it from turning, the said axle being connected to the saddle 14 by embracing clips 20. A set screw 21 in the bottom of the saddle engages an adjacent portion of the axle and prevents the saddle from moving either forwardly or rearwardly. In the event that the saddle becomes injured or worn and unfit for practical service it may be readily replaced by another like device.

The depending shorter arms 10 of the bearers or levers are directed inwardly and terminate below the axle 7 and are formed with eyes 22 having sockets 23 in their inner opposing sides and outwardly extending flaring bores 24. The semi-spherical ends or heads 25 of pressure caps 26 are fitted and movably held in the sockets 23 and each has a bore 27 extending longitudinally therethrough, each cap 26 also being formed with a cylindrical shank 28 and a collar 29 separating the head 25 from said shank. On the shanks 28, in engagement with the collars 29, washers 30 are mounted to prevent wear on said collars by the extremities of a coiled spring 31 fitted over the shanks 28. The pressure caps 26, spring 31 and eyes 22 have a bolt 32 extending therethrough and projecting outwardly from the outer sides of the eyes to receive auxiliary springs 33 and nuts 34, the latter being held in adjustable position by split keys 35. The springs 33 are interposed between the outer sides of the eyes 22 and washer 36 held against the nuts 34. The lower ends or arms 10 of the bearers or levers 6 are held apart by the spring 31 and inward movement of said arms through the depression of the long arms 9 is consequently resisted by said spring 31, yet any such movement is cushioned and shocks or jars are absorbed and prevented from being transmitted to or eased relatively to the body of the vehicle. As soon as the spring 31 is relieved of compressing stress it resumes its normal position or is prevented from having sudden movement by the auxiliary springs 33 which likewise also absorb any shock and obviate transmission of sudden movements to the fulcrums and upper arms of the levers and prevent the latter from coming up too suddenly. The springs 33 also cushion the action of the levers 6 when the lower arms 10, under any contingency are spread apart beyond their normal positions. The bolt 32 has a loose association with the eyes 22 and through the medium of the caps 26 has a partial ball and socket movement, and all strain from resisting contact with the eyes is removed from the bolt with material advantages in permitting the bolt to assume various positions without liability of the least cramping and reduction of the desired sensitiveness of the shock absorbing organization, reducing wear on and avoiding breakage of the bolt. The bolt may be readily removed and reapplied, and if it does become injured at any time to such extent as to interfere with its practical service it may be renewed without renewing the remaining devices in association therewith. The pressure caps 26 by reason of their ball bearings through the medium of the semi-spherical heads 25 and sockets 23 are maintained in alinement as the lower ends of the arms 10 of the levers recede and thereby cause the spring 31 to work in a straight line. The outwardly flaring bores 24 of the eyes 22 remove all possibility of bending the bolt 32 by the clearances they provide at opposite extremities of said bolts. It will also be observed that when the vehicle body is depressed the spring actuated bearers or levers 6 move toward their fulcrum or pivotal points and the force of the spring is thereby materially increased without compressing the said spring to such extent that it would be liable to become set. Furthermore, the spring 31 may be augmented to increase its power to compensate for heavier weight imposed thereon, such for instance as a heavier vehicle body or body frame, or heavy loads, by interposing a rubber spring 37 between the pressure caps and within said spring, the spring 37 acting as a bumper. This spring 37 will form a part of the equipment of the shock absorber for use whenever found necessary. For light vehicles this bumper will be unnecessary and may be removed by taking out the bolt 32.

The lever arms 9 and 10 are also formed with ribs 38 which strengthen them, but at the same time said levers are of light construction. If it is found necessary to raise the levers 6 slightly so that the arms 9 may extend upwardly a greater distance, such adjustment can be readily accomplished by cutting away a portion of the shoulders 12 or the shoulders 19, and by correspondingly changing the thickness of the washers 30 and 36.

By using a straight spring 31 a closer assemblage thereof relatively to the axle is possible and no interference with the proper working of the parts will occur. Such form of spring is also much more reliable than the common form of leaf spring because if one lever should break, the other would hold the axle 7 in place through the medium of the saddle 14 connected to the axle. By using a single bolt 32 inserted through the spring 31 and pressure caps 26 there is less chance of dust or rust clogging the supporting connection for the said spring and the latter.

In the construction shown by Figs. 6, 7 and 8, all of the features hereinbefore described are included and designated by similar reference characters, except that the long arms of the bearers or levers in this instance are in the form of superimposed leaf springs 39, and to render the latter practical for all conditions the springs are arranged for replacement in the event of breakage and capable also of adjustment as to length by adding leaves thereto. The bearer or lever, in addition to the leaf springs 39 includes an elbow 8 and a depending arm 10 essentially similar to the levers heretofore described. The elbow 8 has a rest or table member 40 projecting upwardly therefrom and formed with opposite apertured ears or lugs 41, and at its lower terminal said rest or table member is provided with an overhanging flange 42 to form a seat 43 for the lower ends of the spring leaves which are connected at said ends by a bolt 44 having its head fitted in a socket 45 in the base of the seat. When the number of leaves necessary to produce the length desired have been assembled, they are connected by the bolt 44, or one similar thereto, and disposed on the rest or table member 40 and positively, yet removably, secured by clips 46 which have their shanks inserted through the ears or lugs 41 as shown by Fig. 6. The spring leaves operate as auxiliaries in taking up or absorbing the shock or jar and will be found to be very effective means of easing the movement of the vehicle body.

The invention as thus described has been devised to overcome numerous disadvantages and costs of analogous structures commonly known, and especially to take up and absorb all shocks and jars relatively to a vehicle body, whether of the motor vehicle type or other form, without liability of breakage of the several parts.

To accommodate various applications of the invention, changes in the form, proportions and minor details of the several parts may be adapted without departing from the nature or spirit of the invention.

What is claimed, is:—

1. In a shock absorber for vehicles, the combination with the axle and body structure of a vehicle, of pairs of levers movably connected to said body structure and having sockets at the inner opposing sides of the lower ends, saddles attached to the axle and having the levers fulcrumed thereon, pressure caps having outer ball members engaging the sockets at the inner opposing sides of the lower ends of the levers, spring means interposed between and engaging the inner sides of said caps, and a single bolt extending through the lower ends of the levers, the pressure caps and the spring means.

2. In a shock absorber for vehicles, the combination with the axle and body structure of a vehicle, of pairs of levers movably connected to said body structure and provided with fulcrum means attached to the axle and also having sockets at the inner sides of their lower ends, pressure caps having loose bearing at their outer extremities against the inner sides of the lower ends of the levers, spring means interposed between and engaging the inner portions of the caps, and a single connecting device inserted through the lower ends of the levers, the pressure caps and the spring means and having unrestricted movement in the outer portions of said lever ends.

3. In a shock absorber for vehicles, the combination with the axle and body structure of a vehicle, of opposed levers movably connected to said body structure and provided with fulcrum means at intermediate points attached to the axle, pressure caps having outer ball members loosely bearing in the sockets of the lower ends of the levers, spring means interposed between and engaging the inner opposing portions of the caps, a bolt loosely extending through the spring means, caps and said lever ends and projecting outwardly beyond the latter and having free movement in the outer portions of the said lever ends, auxiliary springs on the outer extremities of the bolt, and means on the outer extremities of the bolt for holding the auxiliary springs in place.

4. In a shock absorber for vehicles, the combination with the axle and body structure of a vehicle, of opposed levers provided with fulcrum means attached to the axle, the lower arms of the levers extending below the axle and inwardly toward each other and having upper table members with inner seats and overhanging flanges, the upper arms of the levers being in the form of closely associated leaf springs, the inner ends of the latter springs being fitted in said seats beneath said flanges, bolts extending through the inner ends of said springs with their heads countersunk in said seats and their opposite ends terminating beneath said flanges, clips applied over the leaf springs and engaging the table members, and shock absorbing spring means interposed between and coöperating with the lower ends of the levers below the axle.

In testimony whereof I hereunto affix my signature in presence of two witnesses.

ARTHUR COLLETTE.

Witnesses:
WINFIELD S. GARLAND,
EDWARD J. BARRY.